United States Patent [19]

Wolf et al.

[11] Patent Number: 4,835,002

[45] Date of Patent: May 30, 1989

[54] MICROEMULSIONS OF OIL IN WATER AND ALCOHOL

[76] Inventors: Peter A. Wolf, 100 Stevens Ave., Valhalla, N.Y. 10595; Margaret J. Havekotte, 74 Byram Terrace Dr., Greenwich, Conn. 06830

[21] Appl. No.: 71,923

[22] Filed: Jul. 10, 1987

[51] Int. Cl.$^4$ ................................................ A23L 2/00
[52] U.S. Cl. .................................... 426/590; 426/602; 426/651
[58] Field of Search .............. 426/651, 590, 601, 602; 424/49

[56] References Cited

U.S. PATENT DOCUMENTS

| | | | |
|---|---|---|---|
| 3,917,859 | 11/1975 | Terada | 426/602 |
| 3,939,290 | 2/1976 | Terada | 426/602 |
| 4,146,499 | 3/1979 | Rosano | 252/8.554 |
| 4,379,755 | 4/1983 | Yamada | 426/602 |
| 4,423,030 | 12/1983 | Hayes | 426/651 |
| 4,465,661 | 8/1984 | Schmolka | 426/651 |
| 4,675,179 | 6/1987 | Suzuki | 514/941 |

*Primary Examiner*—Donald E. Czaja
*Assistant Examiner*—Carolyn Paden
*Attorney, Agent, or Firm*—Scully, Scott, Murphy & Presser

[57] ABSTRACT

Microemulsions of edible oils in a matrix of water and certain alcohols are prepared using certain edible surfactants for use in various products such as beverages.

43 Claims, No Drawings

MICROEMULSIONS OF OIL IN WATER AND ALCOHOL

BACKGROUND OF THE INVENTION

1. Field of the Invention

The present invention relates to microemulsions of edible oils in a matrix of water and certain alcohols with the aid of certain surfactants.

2. Description of the Prior Art

The microemulsions in question are emulsions formed from water, alcohol, oil, and one or more emulsifying agents or surfactants wherein the individual emulsified particles of oil are so small, they are not visible, even when viewed in an optical microscope. The emulsified particles in such emulsions have a particle size of about 100 to 600 A, "Emulsions: Theory & Practice," 2nd Edition, P. Becher, Reinhold Pub. Corp. NY, NY, 1965, at page 297. Although the individual particles of emulsified oil are not visible under an optical microscope, when the entire microemulsion is subjected to light scattering, some haze or turbidity may be visible depending on the particle sizes of the oil droplets. This light scattering effect of such oil droplets is, however, very weak compared, for example, to the light scattering effect produced by the oil droplets in macroemulsions of milk.

Microemulsions are usually transparent dispersions, usually of water-in-oil (w/o), or oil-in-water (o/w), which are formed spontaneously, without the need for any energy input, when the components thereof are uniformly admixed with each other (S. E. Friberg, J. Dispersion Science & Technology, Vol. 6, No. 3, pages 317-337, 1985). Although such microemulsions form spontaneously when they form, the selection of the components therefor, and amounts thereof, are very critical in order to, first, obtain such a microemulsion, and, second, obtain such an emulsion which is stable for any reasonable period of time (Friberg, supra, at page 320). Based on Friberg's studies, short chain alcohols such as isopropanol, which are too soluble in the aqueous phase, are not useful as cosurfactants in oil-in-water microemulsions (Friberg, supra, page 325).

U.S. Pat. No. 4,146,499 also discloses the use of $C_5$-$C_{16}$ fatty alcohols as primary surfactants, and $C_4$-$C_{10}$ tertiary alcohols as secondary surfactants, in the manufacture of certain microemulsions while employing certain combinations of oils and the surfactants in a particular, step-wise process for preparing such emulsions. The use of an essential oil in such emulsions is disclosed in Examples 10 and 11 of U.S. Pat. No. 4146499.

In "Increasing The Stability of Vegetable Oil Solutions With The Aid of Monoglycerides and a Cosurfactant", JAOCS, Vol. 62, No. 9, September 1985, pages 1379-1385, A. M. Vesala et al disclose the evaluation of isopropanol, t-butanol, 1-hexanol, sorbitol, 2- ethoxyethanol and 2-butoxyethanol as possible alcohol co-surfactants in microemulsions of rapeseed oil. The microemulsions of A. M. Vesala et al are water-in-oil type emulsions which are made with & without detergents. Vesala et al indicates that sorbitol did not provide any benefits in the emulsions investigated by them.

The alcohols used in these prior art emulsions are, for the most part, not useful, because of toxicity, legal and adverse flavor characteristic reasons, in microemulsions intended for use in food applications.

U.S. Pat. No. 4,568,480 discloses the preparation of microemulsions with oils, which may include flavor oils, with an alkoxylated phenol compound as a sole, or co-, surfactant.

U.S. Pat. No. 4,595,512 discloses the preparation of acid-in-oil or oil-in-acid microemulsions for various non-food, industrial, applications. Several $C \geq 4$ alcohols are used as cosurfactants in such emulsions.

U.S. Pat. No. 4,404,109 discloses the use of certain N-acyl-$\alpha$ amino acid salts as surfactants in emulsions that contain aqueous saline solutions. Various alcohols are also disclosed as useful cosurfactants. The prime use for these emulsions is in the field of the tertiary recovery of crude oil.

U.S. Pat. No. 4,605,422 discloses oil-in-alcohol microemulsions useful as lubricating fluids.

Prior to the present invention, therefore, the art had not devised processes or formulas whereby a broad range of edible oils might be placed, in a facile manner, in microemulsions that were entirely composed of components that were of food grade quality, and which were microbiologically and thermodynamically stable for long periods of time under ambient conditions of storage and use.

Objects of the Present Invention

An object of the present invention is to provide microemulsions of edible coils employing only food grade components therein.

A further object of the present invention is to provide such microemulsions which are thermodynamically stable for long periods of time, as is, or in products wherein they may be employed as flavor carriers.

A further object is to provide microemulsions of edible coils which are microbiologically stable at a pH of 3.0 to 9.0 for extended periods of time.

A still further object of the present invention is to provide a facile process whereby such storage stable microemulsions might be readily prepared.

Summary of the Present Invention

It has now bee found that these and other objects of the present invention may be accomplished if the microemulsions are formed from the edible oils, water, certain alcohols, and one or more food grade surfactants as further described hereinbelow.

Description of The Preferred Embodiment

Edible Oils

The edible oils which are to be used in the microemulsion systems of the present invention include all those natural edible oils normally extracted, as such, from their plant matter or animal source, usually, but not exclusively, by steam distillation, and without any dilution in a solvent or carrier. Artifical or synthetic forms of the the natural edible oils may also be used.

The edible, or essential, oils derived from plant matter are obtained from various parts of the plants from which they obtained, i.e., leaves, fruit, bark, root, grass, wood, heartwood, gum, balsam, berries, seed, flowers, twigs, and buds (Giovanni Fenaroli, "Handbook of Flavor Ingredients," Vol. 1 (Natural), Volume 2 (Synthetic), CRC Press, 1971; S. Arctander, "Perfumes & Flavor Chemicals," Montclair, N.J., 1969, 2 volumes).

These essential oils would include all those disclosed by S. Arctander and G. Fenaroli, supra, which are the more tasteful types of edible oils, and tend to be liquid at about 20°-25° C., and including:

almond oil (bitter)
anise oil
bergamot oil
camphor oil
caraway oil
cassia ol
cedar leaf oil
cedarwood oil
cinnamon oil
citronella oil
clove oil
cornmint oil (*Mentha arvensis*)
eucalyptus oil
geranium oil
grapefruit oil
lavender oil (spike)
lemon oil
lemongrass oil
lignaloe (bois de rose oil)
lime oil
neroli (orange flower oil)
nutmeg oil
onion and garlic oil
orange oil
origanum oil
orris oil
palmarosa oil
patchouli oil
peppermint oil (*Mentha piperita*)
pettigrain ol
pine oil
pineneedle oil
rose oil (attar of roses)
rosemary oil
sandalwood oil
sassafras oil
spearmint oil
thyme oil
vetiver oil
ylang ylang (cananga oil)

and other essential oils used in beverages and foods for flavors such as coffee, tea, cherry, apple, pineapple, and vanilla.

The useful oils would also include those which are relatively tasteless, or not normally used as essential oils for taste-imparting purposes. These less tasteful oils are, for the most part glyceride based, saturated or unsaturated, materials which are liquids, or pourable, at temperatures in the range of about 20° to 75° C., and are derived from plant or animal (warm- or cold-blooded) sources.

Such relatively tasteless oils derived from plant sources would include fruit, or vegetable or nut derived oils such as olive oil, corn oil, soyabean oil, sunflower seed oil, peanut oil, coconut oil, safflower oil, palm kernel oil, cocoa butter, palm oil, cottonseed oil, sesame seed oil, rapeseed oil, linseed oil, and castor oil.

Such relatively tasteless oils derived from warm blooded animal sources would include butter fat, lard (hogs) tallow (cattle and sheep), and whale oil, and those derived from cold blooded animal sources would include fish liver oils and sardine oils.

The oils may be used individually; or in mixtures of two or more thereof in the microemulsions of the present invention.

The oils may be used in liquid or solid form.

The oils, in liquid or solid form, are not soluble in the alcohols with which they are used in the microemulsions of the present invention.

If the oils are solid at normal temperature, they are warmed up to liquefy them for the purposes of making the microemulsions of the present invention.

Water

The water used in the microemulsions of the present invention need not be purified or distilled. It may be tap water.

The Alcohols

The alcohols that are used in the microemulsions of the present invention include ethanol; propylene glycol (as $CH_2OH—CH_2—CH_2PH$ and/or $CH_3—CHOH—CH_2OH$); glycerol; $C_5-C_{12}$ mono- and di-saccharide sugars, such as, dextrose, sucrose, fructose, as such, or in other forms such as molasses, brown sugar, invert sugar, refinery syrup, corn syrup; and sugar alcohols such as sorbitol, xylitol and mannitol.

The alcohols may be used individually or in mixtures of two or more thereof. The preferred of such alcohols is propylene glycol.

These alcohols are preferentially soluble in water rather than in the flavor oils with which they are used. These alcohols have a distribution coefficient of considerably less than 1 relative to their solubility in water versus their solubility in the flavor oils used in the microemulsions of the present invention. Propylene glycol, for example, has a distribution coefficient of <0.001 relative to its solubility in citrus oil versus its solubility in water.

The determination of distribution coefficients is discussed at pages 525–526 of "Introduction to Organic Laboratory Techniques," by D. L. Pavia et al., 1976, W. B. Saunders Company-Publisher.

Where used in the microemulsions of the present invention, these alcohols do not function as co-surfactants, as is the case in various prior art emulsions employing alcohols therein (See in this regard "A Theory of Aqueous Emulsions," L. M. Prince et al., J. Colloid & Interface Science, Vol. 23, pages 165–173, 1967). The alcohols in the microemulsions of the present invention are thus not essentially present at the interface between an outer and inner phase in the microemulsions, they are only essentially present in the outer water phase and not in the inner oil phase in such microemulsions.

Surfactants

The surfactants which may be used in the microemulsions of the present invention include all those ionic and nonionic surfactants which are useful in orally ingestible products, intended for use by humans, e.g., food, beverages, confections, pharmaceuticals, and dentifrices.

The selection of the surfactants for use with a particular oil depends, as noted below, on the HLB (hydrophile-lipophile balance) value of such surfactants. The HLB value concept of, and determination thereof for, surfactants is disclosed by Milton J. Rosen in "Surfactants & Interfacial Phenomena", J. Wiley & Sons, New York, NY, 1978, pages 242–245 or by Kirk-Othmer, Encyclopedia of Chemical Technology, 3rd Edition, Vol. 8, 1979, at pages 910–915.

The respective listings of HLB values by these authors may, in some cases, provide slightly different numerical HLB values, or ranges thereof, for the same surfactants, due to differences in the respective measuring techiques used by such authors. Each of such respective ranges or values, however, is useful for the purposes of the present invention.

Various ionic (anionic) and non-ionic surfactants, with their HLB values, which are approved for use in food type products and which may be used in the microemulsions of the present invention are as follows:

| | HLB Value* |
|---|---|
| Ionic (Anionic) Surfactant | |
| myristic acid+ | 22 |
| palmitic acid+ | 21 |
| stearic acid+ | 20 |
| oleic acid+ | 20 |
| monoglyceride ester of diacetyltartaric acid | 9.2 |
| digylceride ester of diacetyltartaric acid | 3.2 |
| monoglyceride ester of citric acid | 27 |
| + and salts thereof | |
| diglyceride ester of citric acid | 20 |
| monoglyceride ester of lactic acid | 21 |
| diglyceride ester of lactic acid | 14 |
| dioctyl sodium sulfosuccinate | 18 |
| monoglyceride ester of phosphoric acid | 14 |
| diglyceride ester of phosphoric acid | 8 |
| lecithin | 7 to 9 |
| hydroxylated lecithin** | 8 to 9 |
| Nonionic Surfactants | |
| polysorbates | 10 to 18 |
| sorbitan ester of myristic acid | 6.7 |
| sorbitan ester of palmitic acid | 5.7 |
| sorbitan ester of stearic acid | 4.7 |
| sorbitan ester of oleic acid | 4.7 |
| polyglycerol esters of myristic acid | 3 to 16 depending on the number glycerol units and fatty acid side chains present therein |
| polyglycerol esters of palmitic acid | |
| polyglycerol esters of stearic acid | |
| polyglycerol esters of oleic acid | |
| monoglyceride ester of myristic acid | 4.8 |
| monoglyceride ester of palmitic acid | 4.3 |
| monoglyceride ester of stearic acid | 3.8 |
| monoglyceride ester of oleic acid | 3.1 |
| diglyceride ester of myristic acid | 2.3 |
| diglyceride ester of palmitic acid | 2.1 |
| diglyceride ester of stearic acid | 1.8 |
| diglyceride ester of oleic acid | 1.8 |
| (ethoxy)$_n$ monoglyceride of myristic acid | |
| (ethoxy)$_n$ monoglyceride of palmitic acid | |
| (ethoxy)$_n$ monoglyceride of stearic acid | 13 to 21 |
| (ethoxy)$_n$ monoglyceride of oleic acid | |
| wherein n is a whole number of 10 to 30. | |
| (ethoxy)$_n$ diglyceride of myristic acid | |
| (ethoxy)$_n$ diglyceride of palmitic acid | |
| (ethoxy)$_n$ diglyceride of stearic acid | 7 to 15 |
| (ethoxy)$_n$ diglyceride of oleic acid | |
| wherein n is a whole number of 10 to 30. | |
| sucrose ester of myristic acid | 18 |
| ester of palmitic acid | 17 |
| ester of stearic acid | 16 |
| ester of oleaic acid | 16 |
| propylene glycol ester of myristic acid | 4.4 |
| ester of palmitic acid | 3.9 |
| ester of stearic acid | 3.4 |
| ester of oleaic acid | 4.3 |

*in fully ionized form in water at 20–25° C.
**amphoteric depending on pH of matrix The preferred surfactants are the $C_8$–$C_{18}$ acids and their esters.

Selection of Surfactant(s)

The surfactants useful in the microemulsions of the present invention are those having a HLB value of about 10 to 18 and preferably of about 13–16. Those surfactants which have HLB values which are outside these ranges may be blended with each other and/or with surfactants having HLB values which are within such ranges, as long as the HLB value of the composite blended surfactant system has a HLB value within that of the desired ranges of values. The HLB value of such combinations of surfactants would be calculated or determined in the same way as are the HLB values for the individual surfactants.

The combinations of surfactants that may be used in this regard would thus include
(a) one or more hydrophilic surfactants
(b) one or more lipophilic and one or more hydrophilic surfactants
(c) one or more amphoteric surfactants, alone, or with an (a) or (b) set of surfactants.

Such individual, or combinations of, surfactants shall be characterized herein as a surfactant system. Since the oils to be used in the emulsions of the present invention have different chemical compositions and/or structural configurations, some experimentation is needed in selecting the surfactant system to be used therewith in order to obtain the most desirable results in terms of stable microemulsions having economically and organoleptically acceptable characteristics. Thus, to select one or more particular surfactant systems for use with a particular oil the first step is to ascertain the HLB value of the oil itself. Techniques for determining such HLB values for the oils are known in this art (See for example Kirk-Othmer Encyclopedia of Chemical Technology, 3rd edition, Vol. 8, pages 900–930 supra).

After the HLB value of the oil is established, then one selects one or more of the (a), (b) or (c) types, as noted above, of surfactant systems having a HLB which is within about +2 HLB units of the HLB value of the oil, and then tests such surfactant systems with such oils as follows:

The surfactant system and oil are admixed, in about a 5:1 parts by weight ratio of a candidate surfactant system:oil, with about 10 parts by weight of a candidate alcohol, or a blend of the alcohols listed above, based on the combined weight of only the surfactant system and the alcohol. This admixture will usually be turbid. Water is then added until a clear thermodynamically stable microemulsion can be so obtained with such materials. The combinations of surfactant systems and alcohol which can thus be used with a given oil to provide such stable microemulsion will be those which are useful for the purpose of the present invention.

An alternate process for screening combinations of candidate surfactant systems and the alcohols is to admix about a 5:1 parts by weight ratio of a candidate alcohol to water, based on the combined weight of only the alcohol and the water. These admixtures will always be clear solutions of the alcohols(s) and water. The candidate surfactant is then added, in an amount of up about one part by weight per 10 parts by weight of the combined weight of the alcohol/water mixture. Then the candidate oil is titrated into the clear combination of surfactant system, alcohol and water, as long as the resulting admixture remains clear, i.e., in a stable microemulsion form.

The combination of surfactant system, alcohol, oil(s), and water that can thus be used to provide stable microemulsions will be those which are useful for the purposes of the present invention.

Commercial Preparation of the Microemulsion

Once a combination of surfactants system, alcohol and oil which is useful for the purposes of the present invention is determined experimentally, as noted above, the desired microemulsion are preferable prepared, commercially, as follows:

The alcohol, water and hydrophilic surfactant components are all admixed together to form a first admixture, and then this first admixture is admixed with a second admixture which contains the oil, alone, or in admixture with any liphophilic surfactants which may be being employed. The mixing of such first and second admixtures automatically produce the desired microemulsions.

The microemulsions of the present invention may thus be prepared commercially by merely mixing together the water, alcohol, oil and surfactant components thereof, in the necessary amounts thereof as noted above. No external energy need be added, as in the form of vigorous mixing or homogenizing in order to reduce the oil droplet, or fat particle, size to the desired level. A minimum amount of stirring, however, may be used to facilitate the uniform dispersion of the components among themselves. The microemulsions of the present invention are thus formed spontaneously within a few minutes of the admixing of the components thereof together. The microemulsions of the present invention are relatively non-viscous oil-in-water emulsions, having a viscosity comparable to that of propylene glycol.

A preferred commercial method of forming the microemulsions is to:

(a) separately dissolve a lipophilic surfactant i.e., one having a HLB value of about 2 to 6, in the oil, (b) separately dissolve a hydrophilic surfactant i.e., one having a HLB value of about 6 to 20, in the water, (c) then mix (a) and (b), and then (d) add enough of the alcohol to achieve the microemulsion stage, as evidenced by the clarity, to the naked eye, of the resulting system. Prior to the addition of the full amount of alcohol needed to achieve such clarity, the mixture of (a) and (b) will have a cloudy or turbid appearance.

The oil or fat can be used in liquid, or solid particulate, form. The alcohol may be used in liquid or solid form.

As noted below, the lipophilic surfactant is an optional component of the microemulsions of the present invention. Where the lipophilic surfactant is not used, the oil, as is, is mixed with the (b) admixture of hydrophilic surfactant and water.

The microemulsions will be readily formed using the following amounts of the components thereof:

about 0.01 to 45, and preferably about 1 to 25, weight% of the oil, about 0.1 to 60, and preferably about 1 to 30, weight % of total surfactant composition and about 20 to 95, and preferably about 25 to 80, weight % of the polyol;

with the balance being water, up to 100 weight.

Further, the following weight ratios of the respective components of the microemulsions should also be used with respect to each other:

| weight ratio of | broad ratio | preferred ratio |
|---|---|---|
| alcohol to water | 0.2 to 50 | 0.5 to 30 |
| oil to total surfactant | 0.1 to 10 | 0.2 to 5.0 |
| alcohol to surfactant | >1 | 6 to 20 |

The alcohol to water and alcohol to surfactant ranges given above are primarily based on studies made with propylene glycol, as the sole alcohol to be used in the microemulsions. Additional data provided in the Examples below indicate that the use of other alcohols would also require the same ratios of components.

The more polar is the alcohol the less likely is it to be soluble in the oil and the less of it will be need to achieve the desired clear microemulsions. The order of polarity in this regard is generally as follows: sugar alcohol >sugar >ethanol >glycerine >propylene glycol.

It is also preferable that, when preparing the microemulsions, the pH thereof be maintained between 3 to 9, and preferably between 5 and 7, in order to achieve optimum flavor stability. However, if it is desired to produce a microemulsion with a pH outside this range then a suitable acid or alkali can be added. This usually also requires a slight adjustment of the water content. For food applications, food grade acids and bases would be used for this purpose.

Although it is preferable to use both a lipophilic surfactant and a hydrophilic surfactant, as disclosed above, a single hydrophilic surfactant may be used.

The temperature of each of the components being admixed together may be raised from ambient (about 70 to 75° F.) to a somewhat higher level, of about 140° F., to facilitate the rapid dissolution and admixture of such components. To avoid temperature shock each component should be heated to a temperature which is within about 10° F. of the temperature of each of the other components being mixed together.

The microemulsions of the present invention are thermodynamically stable, as made, and when added to the ingestible products in which they are to be used, for very long periods of time.

These microemulsions will be thermodynamicallly stable as is, for periods of at least one to four years, depending on their composition, at temperatures of about 30 to 140° F., and preferably at 65°±10° F. They will also be thermodynamically stable in the food and other products in which they are used at temperatures of about 30° to 140° F.

Unlike some so-called microemulsions of the prior art, the microemulsions of the present invention are also thermodynamically stable when subject, at 30° to 140° F., to mechanical energy in any form (such as high speed stirring, shaking, etc.).

The microemulsions are particularly useful in products such as beverages, salad dressing, mouthwashes, pharmaceuticals such as cough syrups, hygiene products such as skin lotions, hair lotions and shampoos where the long term clarity of such products is an important commercial selling point. This is particularly true in the case of products wherein such clarity properties have been desired, but have been difficult to obtain to date when using certain types of flavor oils therein. In this regard it is to be noted that it has been very difficult, if not impossible, for those in the art to immediately provide clear spritzer type beverages which are to retain clarity properties when such beverages are to be flavored with natural oils such as orange oil and lemon oil.

Heretofore, in order to provide such spritzer beverages with any clarity, when they were flavored with natural oil materials, it has always been necessary to first remove from the natural oils those fractions thereof that are not soluble in food grade solvents such as ethanol and propylene glycol and only use the resulting extract of the oil as the flavorant for the beverage. This pre-extraction process is not necessary when using natural flavor oils in microemulsions of the present invention intended for use in such spritzer type beverages, and in other products.

Clear, carbonated soft drinks of the spritzer, and other types, which are preferably citrus or cola flavored, can now be readily and directly made with the microemulsions of the present invention so as to provide storage-stable non-ringing beverages. The term "non-ringing" means, in this regard, that the microemulsified oils of the present invention, when used in a carbonated or still beverage will not separate out and rise to the top thereof when the beverages are stored at 40° to 120° F. for >one hour to at least six months. The oils thus do not form a ring at the neck of the bottle in which the beverage may be so stored.

All these types of products and others, which were difficult, if not imposible, to provide with a long term of stability for the emulsions used therein can now be readily prepared with the microemulsions of the present invention and thereby provide clarity for such products relative to the use of microemulsions therein.

When used in food and other types of products, the microemulsions would be used in such amounts as would be needed to provide the desired levels of the oils to the end products. Two or more of such emulsions may be used to thereby provide a blend of the oils therein.

Further, a blend of the oils may also be used in forming a single emulsion, and thereby also provide another means of providing, in microemulsion form, a blend of oils for such products.

The edible, orally ingestible, products in which the microemulsions of the present invention may be used would include comestible as well as semi-comestible, products. The comestible products are those which ar orally ingestible and which are intended to be swallowed, directly or after being chewed or dissolved in the mouth.

The semi-ingestible products are those which are orally ingested, but which are not normally (completely) swallowed. The latter would include chewing gum, chewing tobacco, mouth washes or rinses, dentifrices, gargles.

The microemulsions of the present invention are preferably used in those comestible or semi-comestible products which may be sold in clear, liquid, form such as beverages, salad dressing, mouth rinses or washes and gargles.

The foods and beverages in which the microemulsions of the present invention may be used would include foods and beverages that are "sugar-free" or "sugarless," i.e., those that do not contain calorie supplying sugars or sweeteners, "low calorie" foods and beverages, as defined in 21 C.F.R. 105.66, i.e., those wherein (a) a serving of such food or beverage suplies no more than 40 calories, and (b) the food or beverage does not provide more than 0.4 calories per gram, as consumed, or as a sugar substitute, and "reduced calorie" foods and beverages, i.e., those that contain at least one-third less calories, on a serving-to-serving comparison basis, than a typical comparable food or beverage that is not normally altered or formulated so as to provide a lowering of its normal calorie content.

All of these types of sugar-free, low or reduced calorie food and beverage products can, generally, be classified as diet food or beverage products.

Although primarily intended for use in edible products, the microemulsions may also be used in other types of clear liquid products intended for use on the human body such as skin or body care products, and hair treating materials. When used for such health care products, the components of the microemulsions must all be pharmaceutically acceptable for the intended purpose of such products.

Weight % amounts of the microemulsified oils that might be used in various types of liquid products for human usage would be:

| | Amount of Microemulsion | |
|---|---|---|
| Type Liquid Product | preferred* amount | broader* amount |
| Orally Ingested Comestible Products | | |
| carbonated and non-carbonated (still) beverages | 0.004 to 0.2 | .001 to 100 |
| salad dressings | 1 to 50 | 1 to 100 |
| cough syrup | 0.004 to 0.2 | 1 to 100 |
| Orally Ingested Semi-Comestible Products | | |
| mouthwash or mouthrinse | 0.001 to 0.5 | 0.001 to 20 |
| dentifrice | 0.001 to 0.2 | 0.001 to 10 |
| breath freshener | 0.001 to 0.5 | 0.001 to 20 |
| Health Care Products | | |
| skin or body treating products | 0.001 to 0.5 | 0.001 to 100 |
| hair treating products | 0.001 to 0.5 | 0.001 to 100 |

*based on the total weight of the final product.

The microemulsions of the present invention may also contain, on an optional basis, the following weight % of the following food or pharmaceutical grade additive materials, all of which would be soluble in the amounts of alcohol and water used in the microemulsions:

| type additive | broad+ amount | preferred+ amount |
|---|---|---|
| preservative | 0 to 0.5 | 0 to 0.2 |
| colorant | 0 to 20 | 0 to 15 |
| intense sweetener | 0 to 20 | 0 to 10 |
| salt | 0 to 5 | 0 to 1.0 |
| acid | 0 to 1 | 0 to 0.2 |
| base | 0 to 1 | 0 to 0.2 |
| flavorants other than the oils | 0 to 10 | 0 to 6 |
| fruit/vegetable juice | 0 to 10 | 0 to 5 |

+based on the total weight of the final product.

Because of the fact that the microemulsions of the present invention have a relatively low water activity ($\leq 0.85$) they are not readily susceptible to microbiological instability (or attack) over a broad pH range of 3.0 to 9.0, wherein microbiological instability might be a problem in food type products made with other sources of flavoring oils.

The following examples are merely illustrative of the present invention and are not intended as a limitation upon the scope thereof.

Microemulsions which are thermodynamically stable (clear) for periods of at least one year or longer at 70°–75° F. were prepared using the commercial procedures described above from the following sets of components thereof:

| Component | Type of Component | Amount of Component, in grams |
|---|---|---|
| Example 1 | | |
| ethoxylated monoglyceride | nonionic hydrophilic surfactant | 0.76 |
| orange oil | oil | 1.00 |
| propylene glycol | alcohol | 15.00 |
| water | — | 5.4 |

The Example 1 surfactant system had a HLB value of 16.
The Example 1 orange oil had a HLB value of 13.

| Component | Type of Component | Amount of Component, in grams |
|---|---|---|
| Example 2 | | |
| sodium palmitate | anionic hydrophilic surfactant | 0.63 |
| monoglyceride of fatty acid | nonionic lipophilic surfactant | 0.60 |
| orange oil | oil | 1.00 |
| propylene glycol | alcohol | 11.60 |
| water | — | 10.90 |

The Example 2 surfactant system had a HLB value of 13.
The Example 2 orange oil had a HLB value of 13.

| Component | Type of Component | Amount of Component, in grams |
|---|---|---|
| Example 3 | | |
| decaglycerol monostearate | nonionic lipophilic surfactant | 0.5 |
| polysorbate 60 | nonionic hydrophilic surfactant | 0.3 |
| orange oil | oil | 0.57 |
| propylene glycol | alcohol | 5.0 |
| water | — | 3.4 |

The Example 3 surfactant system had a HLB value of 13.
The Example 3 orange oil had a HLB value of 13.

| Component | Type of Component | Amount of Component, in grams |
|---|---|---|
| Example 4 | | |
| decaglycerol monstearate | nonionic lipophilic surfactant | 1.5 |
| polysorbate 60 | nonionic hydrophilic surfactant | 0.7 |
| dioctylsodium sulfsuccinate | anionic surfactant | 0.3 |
| orange oil | oil | 4.57 |
| propylene glycol | alcohol | 27.0 |
| water | — | 13.0 |

The Example 4 surfactant system had a HLB value of 14.
The Example 4 orange oil had a HLB value of 13.

| Component | Type of Component | Amount of Component, in grams |
|---|---|---|
| Example 5 | | |
| polysorbate 60 | nonionic hydrophilic surfactant | 2.1 |
| 4 fold orange oil | oil | 0.7 |
| cocoa butter | oil | 0.3 |
| propylene glycol | alcohol | 20.0 |
| water | — | 1.5 |

The Example 5 surfactant system had a HLB value of 15.
The Example 5 mixture of orange oil and cocoa butter had a HLB value of 11.

The various weight ratios of the components of the microemulsions of Examples 1–5 are shown below in Table I.

TABLE I

| Example | Total Weight, In Grams, of Components | Ratio of Alcohol/Water | Ratio of Oil/Surfactant | Ratio of Alcohol/Surfactant |
|---|---|---|---|---|
| 1 | 22.16 | 2.8 | 1.3 | 20 |
| 2 | 24.73 | 1.1 | 0.8 | 10 |
| 3 | 9.7 | 1.5 | 0.7 | 6 |
| 4 | 47.0 | 2.1 | 1.8 | 11 |
| 5 | 24.6 | 13.3 | 0.48 | 10 |

EXAMPLES 6–13

Eight (8) microemulsions were prepared according to the present invention using propylene glycol as the alcohol and Tween 60 (polysorbate 60) as the sole surfactant in these Examples 6–13. This surfactant has a HLB value of 15. Various individual oils, or combinations thereof, were used in these microemulsions. The commercial procedure described above was used to prepare these microemulsions, which are thermodynamically stable for periods of at least one year, or longer, at 70°–75° F. The compositions of these microemulsions are shown in the following Table I.

The butterfat used in Example 11 was liquidified at 100° F. prior to emulsifying it. The resulting microemulsion was liquid and slightly opaque, since the emulsified particles had a particle size at the higher level of the 100 to 600 A particle size range peculiar to microemulsified particles.

TABLE I

| Example | Oil-used | Amount Used, in Grams, (& Weight %) of Oil | Tween 60 | Alcohol | Water | Total Grams | Weight Ratio of Alcohol/Water | Oil/Tween 60 | Alcohol/Tween 60 |
|---|---|---|---|---|---|---|---|---|---|
| 6 | Artificial Cherry | 1.34 (3.4) | 1 (2.6) | 30.19 (77.6) | 6.4 (16.4) | 38.93 | 4.7 | 1.34 | 30.19 |
| 7 | Lemon | 0.22 (1.5) | 1 (6.8) | 12 (81.5) | 1.50 (10.2) | 14.72 | 8 | 0.22 | 12 |
| 8 | Lemon | 0.55 (3.5) | 1 (6.5) | 12 (78.1) | 1.80 (11.6) | 15.35 | 6.7 | 0.55 | 12 |
| 9 | Spearmint | 0.50 (3.3) | 1 (6.6) | 12 (79.5) | 1.6 (10.6) | 15.10 | 7.5 | 0.50 | 12 |
| 10 | Cinnamon | 0.74 (3.3) | 1 (4.5) | 17.13 (76.4) | 3.54 (15.8) | 22.41 | 4.8 | 0.74 | 17.13 |
| 11 | Butterfat | 0.2 (1.4) | 1 (7.0) | 12 (82.8) | 1.3 (9.0) | 14.5 | 9.2 | 0.2 | 12 |
| 12 | Cod Liver + Lemon | 0.15 + 1.0 (5.2) | 2 (9.1) | 17 (77.1) | 1.9 (8.6) | 22.05 | 8.95 | 0.575 | 8.5 |
| 13 | Castor + Lemon | 0.15 + 1.0 (5.2) | 2 (9.0) | 17 (76.7) | 2.0 (9.0) | 22.15 | 8.5 | 0.575 | 8.5 |

EXAMPLES 14–22

Nine (9) additional microemulsions were prepared according to the present invention using various individual or combinations of alcohols, with Tween 60 (polysorbate 60) as the sole surfactant. The oil used in all the examples was a mixture of essential oils used for flavoring cola beverages. The commercial procedure described above was used to prepare these microemulsions, which are thermodynamically stable for periods of at least one year, or longer, at 70°–75° F. The compositions of these microemulsions are shown in the following Table II.

TABLE II

| Example | Amount Used, In Grams, (& Weight %) of | | | | | | | Weight Ratio of | | |
|---|---|---|---|---|---|---|---|---|---|---|
| | Oil | Tween 60 | PG | ETOH | GLY | HFCS | Water | Total Grams | Total Alcohol/H$_2$O | Oil/Tween 60 | Total Alcohol/Tween 60 |
| 14 | 1.6 (4.1) | 1.6 (4.1) | 29.62 (75.4) | — | — | — | 6.47 (16.5) | 39.29 | 4.6 | 1 | 18.5 |
| 15 | 1.6 (3.5) | 1.6 (3.5) | 29.62 (63.9) | — | — | 9 (19.4) | 4.53 (9.7) | 46.35 | 8.5 | 1 | 24.1 |
| 16 | 1.6 (2.4) | 1.6 (2.4) | 29.62 (44.6) | — | — | 30.14 (45.4) | 3.46 (5.2) | 66.42 | 17.3 | 1 | 37.4 |
| 17 | 1.6 (3) | 1.6 (3) | 29.62 (56.4) | 9 (17.2) | — | — | 10.67 (20.3) | 52.49 | 3.6 | 1 | 24.1 |
| 18 | 1.6 (1.7) | 1.6 (1.7) | 29.62 (30.9) | 33.04 (34.5) | — | — | 30 (31.3) | 95.86 | 2.1 | 1 | 39.2 |
| 19 | .8 (1.7) | .8 (1.7) | 14.8 (31.5) | 16.4 (29.8) | — | — | 14.2 (30.2) | 47 | 2.2 | 1 | 39 |
| 20 | .8 (2) | .8 (2) | 14.8 (36.1) | — | 16.53 (40.4) | — | 8.02 (19.6) | 40.95 | 3.9 | 1 | 39.2 |
| 21 | 1.22 (3.1) | 1.22 (3.1) | 10 (25.6) | 2.6 (6.7) | — | 16 (41.1) | 8 (20.5) | 39.04 | 3.6 | 1 | 23.4 |
| 22 | 1.15 (3.2) | 1.22 (3.4) | — | 9.6 (26.4) | 16.11 (44.3) | — | 8.27 (22.7) | 36.35 | 3.1 | .94 | 21.1 |

PG = propylene glycol
GLY = glycerine
ETOH = ethanol
HFCS = high fructose corn syrup

EXAMPLE 23

An orange flavored ring-less carbonated beverages is made according to the present invention by mixing together the following components:

| Amount of Component, % Weight, By Volume | Component |
|---|---|
| 0.1 | microemulsion of Example 1 above |
| 13.0 | sucrose |
| 0.04 | potassium benzoate |
| 0.01 | potassium sorbate |
| balance (to 100%) | water |

The product is then acidified to a pH of 2.7 with citric acid and carbonated to 2.8 volumes CO$_2$. The product is then bottled to produce the desired ring-less beverage product.

EXAMPLE 24

A cherry flavored diet (low-calorie) carbonated beverage is made according to the present invention by mixing together the following components:

| Amount Of Component, % Weight, By Volume | Component |
|---|---|
| 0.04 | microemulsion of Example 6 above |
| 0.05 | aspartame |
| 0.04 | potassium benzoate |
| 0.01 | potassium sorbate |
| balance (to 100%) | water |

The product is then acidified to a pH of 2.8 with malic acid and carbonated with 3.0 volumes of CO$_2$. The product is then bottled to produce the desired ring-less beverage product.

EXAMPLE 25

The mint flavored spritzer type carbonated beverage is prepared according to the present invention by mixing together the following components:

| Amount Of Component, % Weight, By Volume | Component |
|---|---|
| 0.01 | microemulsion of Example 9 |
| 0.04 | potassium benzoate |
| 0.01 | potassium sorbate |
| balance (to 100%) | water |

The produt is then carbonated with 3.5 to 4.0 volumes of CO$_2$. The product is then bottled to produce the desired ring-less beverage product.

EXAMPLE 26

A cola flavored carbonated beverage is prepared according to the present invention by mixing together the following components:

| Amount of Component, % Weight, By Volume | Component |
|---|---|
| 0.005 | microemulsion of Example 15 above |
| 11.0 | high fructose corn syrup |
| balance (to 100%) | water |

The product is then acidified to a pH of 2.5 with phosphoric acid and carbonated with 3.0 volumes of CO$_2$.

Potassium benzoate and potassium sorbate are used as preservatives in the beverages of Examples 23, 24 and 25.

What is claimed is:

1. An edible concentrated microemulsion of edible essential oil in a matrix of water and alcohol selected from the group consisting of ethanol, propylene glycol, glycerine, sugar, sugar alcohol and mixtures thereof,
   said microemulsion comprising
   about 1 to 25 weight % of said essential oil,
   about 1 to 30 weight % of at least one surfactant, and
   about 25 to 80 weight % of said alcohol, with the balance being water, up to 100 weight %,
   with the provisos that
   said alcohol and said water are present in a weight ratio to each other of about 0.5 to 30,
   said oil and said surfactant are present in a weight ratio to each other of about 0.2 to 5.0,
   said alcohol and said surfactant are present in a weight ratio to each other of about 6 to 20, and
   said surfactant and said oil are present in a weight ratio to each other of about 0.2 to 5.

2. A microemulsion as in claim 1 comprising one or more surfactants having a composite HLB value of about 10 to 18.

3. A microemulsion as in claim 2 in which said surfactants have a composite HLB value of about 13 to 16.

4. A mircoemulsion as in claim 2 wherein the aqueous phase of such emulsion has a pH of about 3 to 9.

5. A microemulsion as in claim 4 which has a pH of about 5 to 7.

6. A microemulsion as in claim 1 which is stable at 70°–75° F., for ≧one year.

7. A microemulsion as in claim 1 in which said oil comprises citrus fruit oil.

8. A microemulsion as in claim 7 in which said oil comprises orange oil.

9. A microemulsion as in claim 7 in which said oil comprises lemon oil.

10. A microemulsion as in claim 7 in which said oil comprises grapefruit oil.

11. A microemulsion as in claim 7 in which said oil comprises cola flavoring essential oil.

12. A ring-less beverage flavored with citrus fruit oil and comprising as said oil imparting component thereof, at least one preformed microemulsion of said oil in a matrix of water and alcohol selected from the group consisting of ethanol, propylene glycol, glycerine, sugar, sugar alcohol and mixtures thereof,
   said microemulsion comprising
   about 1 to 25 weight % of said essential oil,
   about 1 to 30 weight % of at least one surfactant, and
   about 25 to 80 weight % of said alcohol, with the balance being water, up to 100 weight %,
   with the provisos that
   said alcohol and said water are present in a weight ratio to each other of about 0.5 to 30,
   said oil and said surfactant are present in a weight ratio to each other of about 0.2 to 5.0,
   said alcohol and said surfactant are present in a weight ratio to each other of about 6 to 20, and
   said surfactant and said oil are present in a weight ratio to each other of about 0.2 to 5.

13. A comestible product as in claim 12 which is a carbonated beverage.

14. A comestible product as in claim 12 which is a spritzer type beverage.

15. A comestible product as in claim 12 in which said oil comprises orange oil.

16. A comestible product as in claim 12 in which said oil comprises lemon oil.

17. A comestible product as in claim 12 in which said oil comprises grapefruit oil.

18. A comestible product as in claim 12 which is a diet beverage.

19. A comestible product as in claim 18 which is a low calorie beverage.

20. A comestible product as in claim 18 which is a reduced calorie beverage.

21. A comestible product as in claim 18 which is a sugar free beverage.

22. An edible concentrated microemulsion of edible essential oil in a matrix of water and alcohol selected from the group consisting of ethanol, propylene glycol, glyerine, sugar, sugar alcohol and mixtures thereof,
   said microemulsion consisting essentially of
   about 1 to 25 weight % of said essential oil,
   about 1 to 30 weight % of at least one surfactant, and
   about 25 to 80 weight % of said alcohol, with the balance being water, up to 100 weight %,
   with the provisos that
   said alcohol and said water are present in a weight ratio to each other of about 0.5 to 30,
   said oil and said surfactant are present in a weight ratio to each other of about 0.2 to 5.0,
   said alcohol and said surfactant are present in a weight ratio to each other of about 6 to 20, and
   said surfactant and said oil are present in a weight ratio to each other of about 0.2 to 5.

23. A microemulsion as in claim 22 comprising one or more surfactants having a composite HLB value of about 10 to 18.

24. A microemulsion as in claim 23 in which said surfactants have a composite HLB value of about 13 to 16.

25. A microemulsion as in claim 23 wherein the aqueous phase of such emulsion has a pH of about 3 to 9.

26. A microemulsion as in claim 25 which has a pH of about 5 to 7.

27. A microemulsion as in claim 22 which is stable at 70°–75° F., for ≧one year.

28. A microemulsion as in claim 22 in which said oil comprises citrus fruit oil.

29. A microemulsion as in claim 28 in which said oil comprises orange oil.

30. A microemulsion as in claim 28 in which said oil comprises lemon oil.

31. A microemulsion as in claim 28 in which said oil comprises grapefruit oil.

32. A microemulsion as in claim 22 in which said oil comprises cola flavoring essential oil.

33. A ring-less beverage flavored with citrus fruit oil and consisting of, as said oil imparting component thereof, at least one preformed microemulsion of said oil in a matrix of water and alcohol selected from the group consisting of ethanol, propylene glycol, glycerine, sugar, sugar alcohol and mixtures thereof,
   said microemulsion consisting essentially of
   about 1 to 25 weight % of said essential oil,
   about 1 to 30 weight % of at least one surfactant, and
   about 25 to 80 weight % of said alcohol, with the balance being water, up to 100 weight %,
   with the provisos that
   said alcohol and said water are present in a weight ratio to each other of about 0.5 to 30, said oil and said surfactant are present in a weight ratio to each other of about 0.2 to 5.0,
said alcohol and said surfactant are present in a weight ratio to each other of about 6 to 20, and
said surfactant and said oil are present in a weight ratio to each other of about 0.2 to 5.

34. A beverage as in claim 33 which is a carbonated beverage.

35. A beverage as in claim 34 which is a spritzer type beverage.

36. A beverage as in claim 33 in which said oil comprises orange oil.

37. A beverage as in claim 33 in which said oil comprises lemon oil.

38. A beverage as in claim 33 in which said oil comprises grapefruit oil.

39. A beverage as in claim 33 which is a diet beverage.

40. A beverage as in claim 39 which is a low calorie beverage.

41. A ring-less cola flavored beverage wherein the cola flavor is, as the flavor oil imparting component thereof, at least one preformed microemulsions of said oil in a matrix of water and alcohol selected from the group consisting of ethanol, propylene glycol, glycerine, sugar, sugar alcohol and mixtures thereof,
said microemulsion consisting essentially of
about 1 to 25 weight % of said essential oil,
about 1 to 30 weight % of at least one surfactant, and
about 25 to 80 weight % of said alcohol, with the balance being water, up to 100 weight %,
with the provisos that
said alcohol and said water are present in a weight ratio to each other of about 0.5 to 30,
said oil and said surfactant are present in a weight ratio to each other of about 0.2 to 5.0,
said alcohol and said surfactant are present in a weight ratio to each other of about 6 to 20, and
said surfactant and said oil are present in a weight ratio to each other of about 0.2 to 5.

42. A beverage as in claim 41 which is a diet beverage.

43. A beverage as in claim 42 which is a low calorie beverage.

* * * * *

UNITED STATES PATENT AND TRADEMARK OFFICE
CERTIFICATE OF CORRECTION

PATENT NO. : 4,835,002

DATED : May 30, 1989

INVENTOR(S) : Peter A. Wolf, et al.

It is certified that error appears in the above-identified patent and that said Letters Patent is hereby corrected as shown below:

On the Title page, Section [21]: "71,923" should read as --071,923--

Column 1, line 53: "4146499" should read as --4,146,499--

Column 2, line 7: "$C \geqq 4$" should read as --$C \geq 4$--

Column 2, lines 28 & 35: "coils" should read as --oils--

Column 2, line 42: "bee" should read as --been--

Column 2, line 55: "Artifical" should read as --Artificial--

Column 3, lines 6 & 31: "ol" should read as --oil--

Column 3, line 56: "soyabean" should read as --soybean--

Column 4, line 14: "$CH_2PH$" should read as --$CH_2OH$--

Column 4, line 52: "products," should read as --products--

Column 5, lines 54, 55, 56, 58 & 60: "ester of" should read as --sucrose ester of--

Column 6, line 36: "+2" should read as --$\pm 2$--

Column 6, line 50: "purpose" should read as --purposes--

UNITED STATES PATENT AND TRADEMARK OFFICE
CERTIFICATE OF CORRECTION

PATENT NO. : 4,835,002

DATED : May 30, 1989

INVENTOR(S) : Peter A. Wolf, et al.

It is certified that error appears in the above-identified patent and that said Letters Patent is hereby corrected as shown below:

Column 6, line 68: "Microemulsion" should read as --Microemulsions--

Column 7, line 4: "microemulsion" should read as --microemulsions--

Column 7, line 4: "preferable" should read as --preferably--

Column 7, line 10: "liphophilic" should read as --lipophilic--

Column 8, line 14: "need" should read as --needed--

Column 8, line 44: "thermodynamicallly" should read as --thermodynamically--

Column 9, line 23: " $>$ " should read as -- $\geq$ --

Column 9, line 45: "ar" should read as --are--

Column 9, line 67: "suplies" should read as --supplies--

Column 10, line 64: " $\leq$ " should read as -- $\leq$ --

Column 11, line 37: "monstearate" should read as --monostearate--

Column 11, line 41: "sulfsuccinate" should read as --sulfosuccinate--

Column 11, line 42; "4.57" should read as --4.50--

Column 12, line 22: "9.7" should read as --9.77--

UNITED STATES PATENT AND TRADEMARK OFFICE
CERTIFICATE OF CORRECTION

PATENT NO. : 4,835,002

DATED : May 30, 1989

INVENTOR(S) : Peter A. Wolf, et al.

It is certified that error appears in the above-identified patent and that said Letters Patent is hereby corrected as shown below:

Column 12, line 39: "liquidified" should read as --liquified--

Column 13, line 41: "beverages" should read as --beverage--

Column 14, line 50: "produt" should read as --product--

Column 15, line 29, Claim 4: "mircoemulsion" should read as --microemulsion--

Column 15, line 34, Claim 6: " $\geq$ " should read as -- $>$ --

Column 16, line 18, Claim 22: "glyerine" should read as --glycerine--

Column 16, line 44, Claim 27: " $\geq$ " should read as -- $>$ --

Signed and Sealed this

Eighteenth Day of February, 1992

Attest:

HARRY F. MANBECK, JR.

*Attesting Officer*   *Commissioner of Patents and Trademarks*